United States Patent [19]

Sears

[11] 4,392,604
[45] Jul. 12, 1983

[54] PANEL WELDING SYSTEM
[75] Inventor: Stanley L. Sears, Seattle, Wash.
[73] Assignee: The Boeing Company, Seattle, Wash.
[21] Appl. No.: 181,863
[22] Filed: Aug. 27, 1980
[51] Int. Cl.³ .................... B23K 37/02; B23K 37/04
[52] U.S. Cl. ............................. 228/212; 219/124.34;
    219/125.1; 228/25; 228/32; 228/44.1 R;
    228/102; 269/21
[58] Field of Search ................... 219/124.34, 125.1;
    228/25, 26, 28, 31, 32, 45, 44.1 R, 102, 212;
    269/21

[56] References Cited
U.S. PATENT DOCUMENTS

| | | |
|---|---|---|
| 2,549,254 | 4/1951 | Smyth . |
| 2,782,574 | 2/1957 | Copold . |
| 2,925,017 | 2/1960 | Bales et al. . |
| 3,328,555 | 6/1967 | Dinter, Jr. ............... 219/124.34 X |
| 3,704,822 | 12/1972 | Nomura ............................... 228/25 |
| 3,712,529 | 1/1973 | Ozawa et al. ................. 228/44.1 R |
| 3,765,289 | 10/1973 | Gerber et al. . |
| 3,848,327 | 11/1974 | Gerber et al. .................... 269/21 X |
| 3,870,853 | 3/1975 | Reinhardt et al. ............... 228/25 X |
| 4,053,097 | 10/1977 | Linam ........................... 228/44.1 R |
| 4,236,701 | 12/1980 | Mayer .................................. 269/21 |

FOREIGN PATENT DOCUMENTS 407699 4/1974 U.S.S.R. ............................. 228/125

OTHER PUBLICATIONS

*Production Engineering*, Aug. 1979, p. 10.
*Welding Journal*, American Welding Society, Sep. 1979, pp. 54–55.
*Metal Fabricating News*, Sep.–Oct. 1979, p. 23.

Primary Examiner—Kenneth J. Ramsey
Attorney, Agent, or Firm—Christensen, O'Connor, Johnson & Kindness

[57] ABSTRACT

An integrated welding torch and work positioning roller head assembly is mounted for controlled movement on a cross travelling gantry carriage overlying a vacuum hold-down bed that supports a workpiece panel. The torch and roller head assembly has two related configurations, one for forming a butt weld along a seam joining edgewise abutting sections of flat stock to form a relatively larger unitary panel, and another head configuration for subsequently positioning and fillet welding stiffener webs to one face of the panel. Each of the head assembly configurations is provided with a cofunctioning arrangement of a welding torch (or torches) and seam tracker (or seam trackers) for positioning the torch (or torches) relative to the head assembly as the assembly is automatically guided by the gantry carriage along the intended seam, and a plurality of workpiece positioning and holding rollers which cofunction with the vacuum hold-down bed to form distortion-free panels, having consistently uniform welds along the seams, without the need of preliminary tack welding and without requiring special purpose jigs and tooling for each different panel and stiffener shape.

20 Claims, 10 Drawing Figures

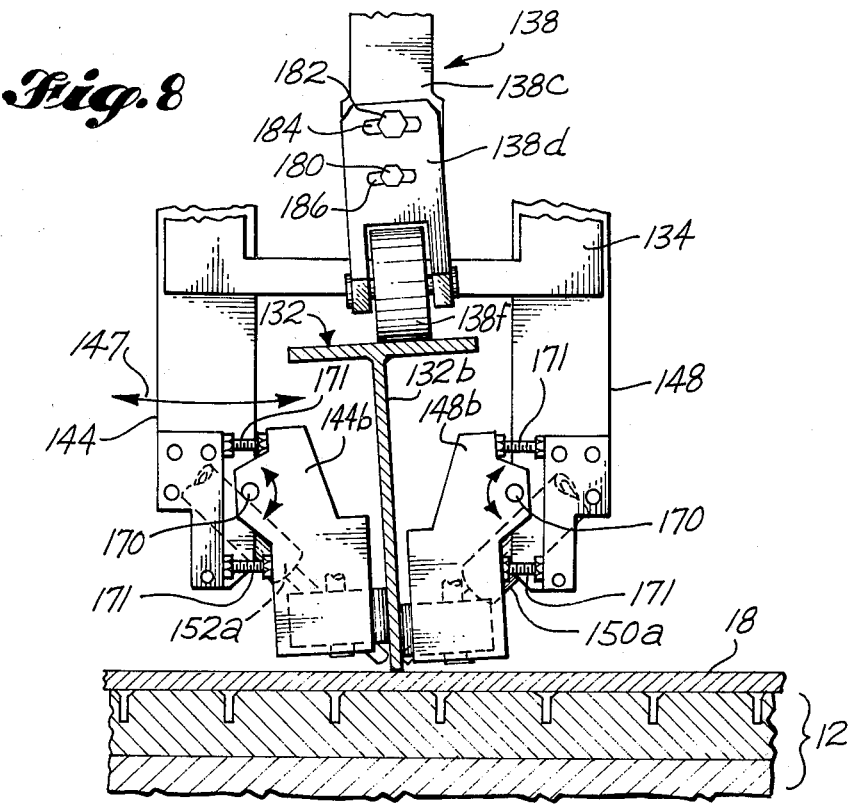
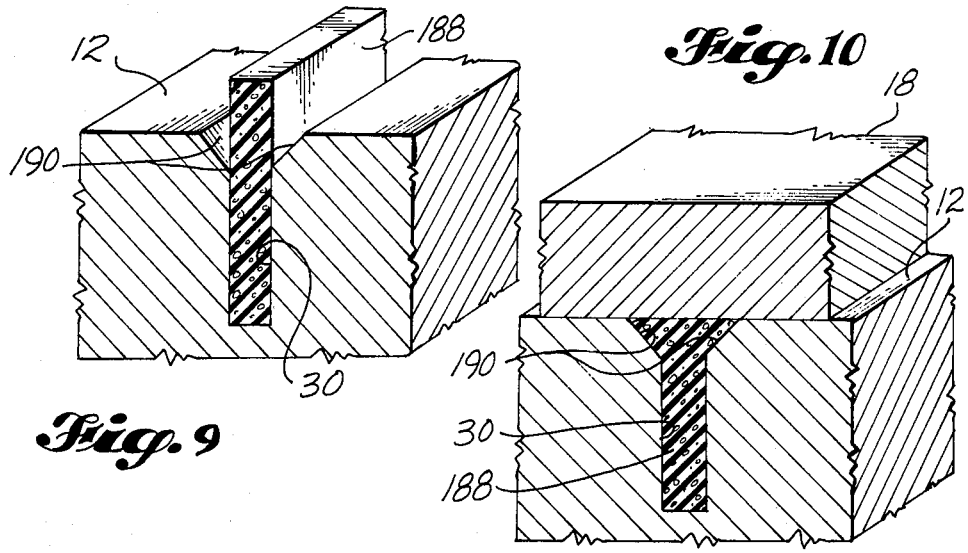

PANEL WELDING SYSTEM

BACKGROUND

The invention relates to automatic and semi-automatic welding systems for butt welding sections of flat stock into relatively large unitary panels, and for applying stiffener webs to such panels.

In fabricating relatively large, stiffener reinforced panels from thin metal stock, the required welding operations entail a number of difficult part-holding tasks, primarily because of material shrinkage associated with the localized heating and subsequent cooling of the welded areas. For example, in the manufacture of reinforced panel sections for the hull and decks of a lightweight metal ship, made of aluminum, it is not uncommon to incur substantial wastage of materials and parts due to permanent and excessive distortion exhibited in completed subassemblies that has resulted from localized expansion and subsequent shrinkage of material adjacent butt welded seams, and adjacent fillet welds that join stiffener webs to the panel.

Heretofore, the only practical solution to these problems has been to carfully and manually tack weld the various workpieces together, and then employ special purpose jigs and tooling to constrain the parts to the proper position during the completion of manually performed butt and fillet welding operations. Preliminary tack welding followed by manual strength welding has been found not only very time consuming and inefficient, but also the cause of many irregularities and defects in the completed welds. Moreover, the special purpose tooling and jigs, required by the nature of the manual welding operations, are not universally usable with different workpiece configurations, and thus it has been necessary for the manufacturer to build and maintain numerous and widely varied tools and jig assemblies to match the size and shape of each of the particular panel/stiffener subassembly.

Accordingly, one object of the invention is to provide an apparatus, suitable for use in conjunction with an automatic or semi-automatic welding system, for holding workpieces that are to be joined by welding in a way that eliminates distortion in the completed assembly, which would otherwise occur as the result of localized expansion and subsequent shrinkage of material during the welding operations.

Another object is to provide in an automatic or semi-automatic welding system, method and apparatus for welding together flat stock into relatively larger unitary panels by a sequence of butt welding operations wherein the sections of flat stock are held in place during automatic or semi-automatic welding in such a way as to eliminate warpage or other distortion of the completed panel.

Additionally, it is an object of the invention to provide method and apparatus, for use in conjunction with an automatic or semi-automatic welding system, for placing, positioning, holding and welding a stiffener web to a workpiece panel and to accomplish these tasks in a way that produces a completed subassembly of a reinforced panel structure that is substantially free of permanent distortion which would otherwise result from successive expansion and shrinkage of the panel and stiffener which unavoidably occurs during the welding operation.

SUMMARY OF THE INVENTION

Briefly, the foregoing objects are met by the provision of a vacuum hold-down bed and a torch and roller supporting head assembly that coacts with the vacuum hold-down bed to so constrain the flat workpiece and applied stiffeners during the welding operations that preliminary torch welding is eliminated and distortion in the completed panel is substantially minimized. For forming the butt welds along edgewise abutting seams of the flat stock, a head assembly configuration is employed in which the welding torch is disposed between an array of down pressure rollers, that both lead and trail the torch tip with respect to the direction of head travel along the seam. The sets of leading and trailing rollers are provided with independent down pressure biasing on opposite sides of the seam so as to ensure that both edges of the workpieces are adequately held down in the presence of irregular waviness along the edges of thin stock, and when workpieces of different thickness are to be joined. Moreover, the array of leading and trailing down pressure rollers are distributed over an area proximate the torch tip where the effects of localized heating during welding would otherwise cause buckling of the workpieces along the seam due to thermal expansion.

Following the butt welding operation performed by a head assembly of the above-described configuration, the panel stiffeners are welded in place by a stiffener steering, holding and welding head assembly. While the panel remains in a held-down position on the vacuum hold-down bed, this second head configuration advances along the stiffener and panel and incorporates a leading down pressure roller for pressing down on an upper edge or surface of a stiffener, a plurality of laterally opposed steering rollers for following the leading down pressure roller and steering the unattached length of stiffener to the desired position on the workpiece panel, a trailing down pressure roller for forcing the lower extent of the stiffener down into positive contact with the panel, and a pair of welding torches staggered in the direction along the path of head travel and at locations generally underlying the trailing down pressure roller, near simultaneous fillet welds along opposite sides of the stiffener.

To provide a complete disclosure of the invention, reference is made to the appended drawings and following description of certain particular and preferred embodiments.

BRIEF DESCRIPTION OF THE DRAWINGS

FIG. 8 is a front elevational view of the stiffener positioning and welding head assembly of FIGS. 5–7, showing an alternative configuration of the steering and down pressure rollers supported by the head assembly for applying a pre-camber to the stiffener so as to compensate for weld shrinkage distortion which would otherwise be exhibited in the completed workpiece.

FIGS. 9 and 10 are detail views, showing vertical sections through the vacuum hold-down bed to depict the configuration of vacuum communicating slots and cooperating elastomeric seals which are positioned in the slots to create a hold-down suction acting on flat stock laid on the gantry bed shown in the welding system of FIG. 1.

DETAILED DESCRIPTION

Figure 1:
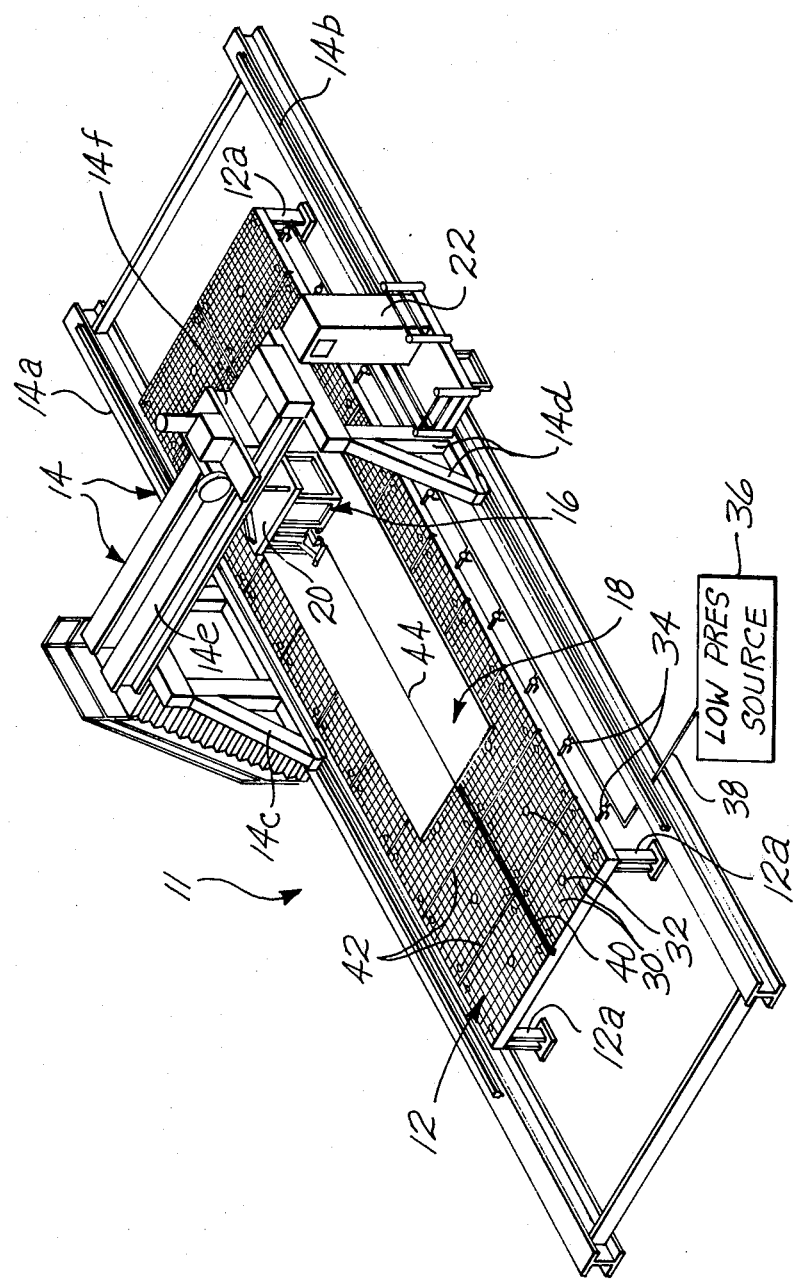
FIG. 1 is an isometric view of a gantry-mounted panel welding system incorporating the coacting vacuum and roller hold-down features in accordance with the invention, including an automatically controlled torch and roller supporting head assembly.

With reference to FIG. 1, the panel welding system having coacting vacuum and roller hold-down and positioning means in accordance with the invention, is shown in the environment of a gantry-type, automatically controlled welding system 11 including a workpiece supporting, vacuum hold-down bed 12, a gantry 14 for supporting and controlling the movement of a gantry carriage from which a welding head assembly 16 depends so as to overlie bed 12 and a workpiece (or workpieces) 18 of aluminum or other metal stock laid thereon.

Gantry 14 includes a pair of spaced, floor-mounted, parallel tracks 14a and 14b, on which shoe fitted lower ends of gantry legs 14c and 14d ride. The upper ends of legs 14c and 14d support an elevated crossbeam 14e including carriage guides for guiding a crosswise travelling head supporting carriage 14f. Head assembly 16 is mounted to carriage 14f by a bracket 20 so that head 16 depends downwardly from carriage 14f with the lower extent of the head proximate to bed 12. Conventional, electrically controlled drives are provided for controllably moving legs 14c and 14d of gantry 14 along tracks 14a and 14b, and for controllably driving carriage 14f crosswise on gantry 14, all under the automatic control of a system based on conventional control circuitry provided in a control unit 22.

Figure 3:
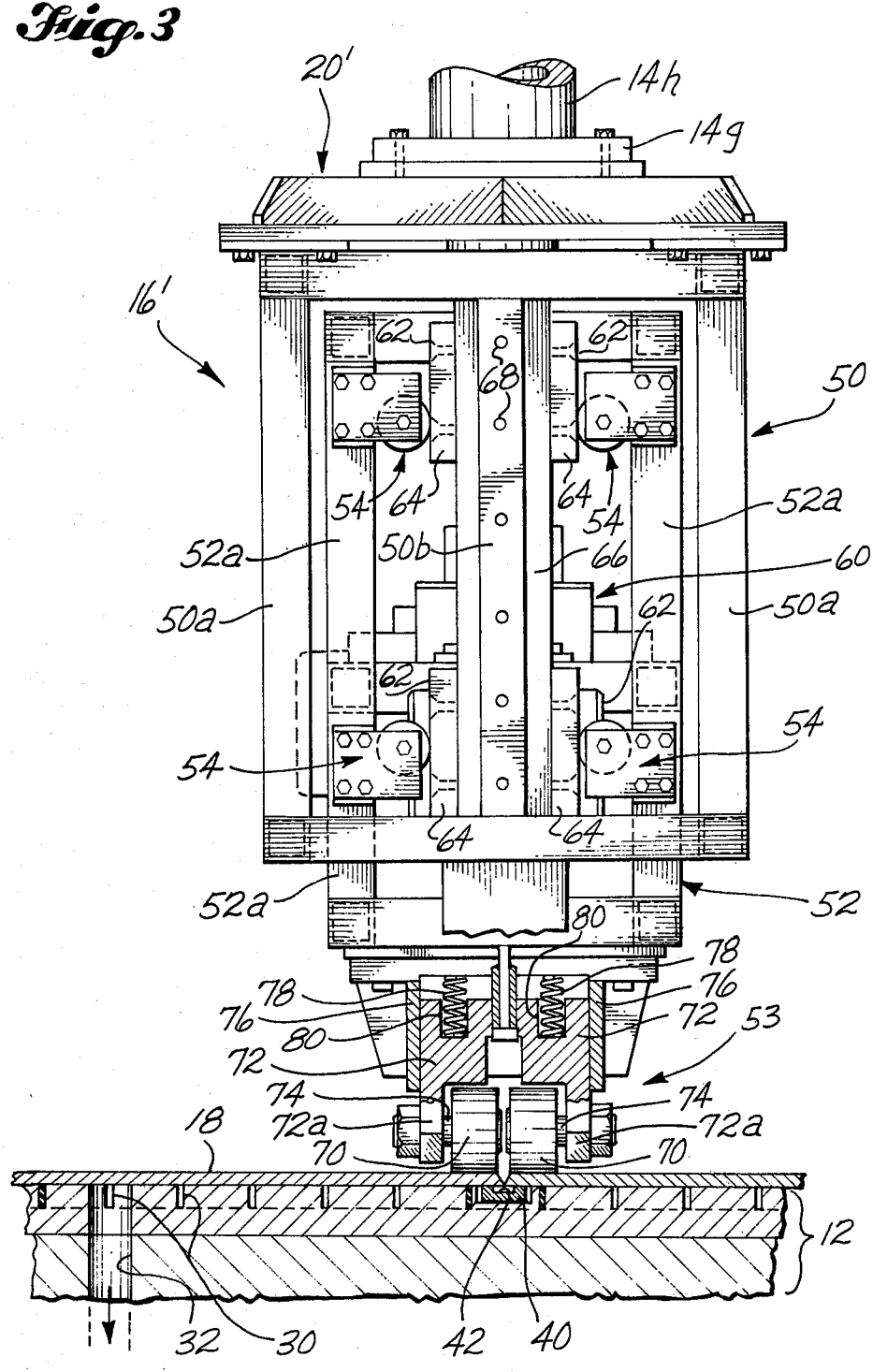
FIG. 3 is a front elevational view, partly cut away and partly in vertical section for clarity, showing the butt seam welding head assembly of FIG. 2.

Vacuum hold-down bed 12 is in this embodiment provided by an aluminum table elevated above the floor by legs 12a to provide a convenient working surface. The upper surface of bed 12 is formed with a grid of crosswise intersecting slots 30 and a plurality of spaced vacuum ports 32. Ports 32 are connected to a source 36 of subatmospheric (low) air pressure which in turn is communicated to the various slots for creating a hold-down suction on the lower side of workpiece 18. To form a seal around the perimeter of the lower surface of workpiece 18, the individual slots of grid 30 are formed so as to receive an elastomeric sealing strip as described more fully herein in conjunction with FIGS. 9 and 10. Ports 32 are supplied with the subatmospheric air pressure by a network of air lines connected to the various ports beneath bed 12, and then manifolded through individual zone control valves 34 to source 36 over a line 38. Thus, by selective operation of valves 34, the individual ports 32 are supplied with a subatmospheric air pressure so as to create a partial vacuum in the slots adjacent to and in communication with the ports, and so that in conjunction with the elastomeric sealing strips shown in FIGS. 9 and 10, selective zones of vacuum hold-down force are formed on bed 12 for holding workpiece 18 in place. As shown in FIG. 3, each of ports 32 extends upwardly from beneath bed 12 and is positioned to intersect with at least one of the slots 30 so that the partial vacuum is communicated first to one slot and thence to the adjacent intersecting slots, and so forth, until such progressive communication is blocked by a sealing strip or strips.

Figure 2:
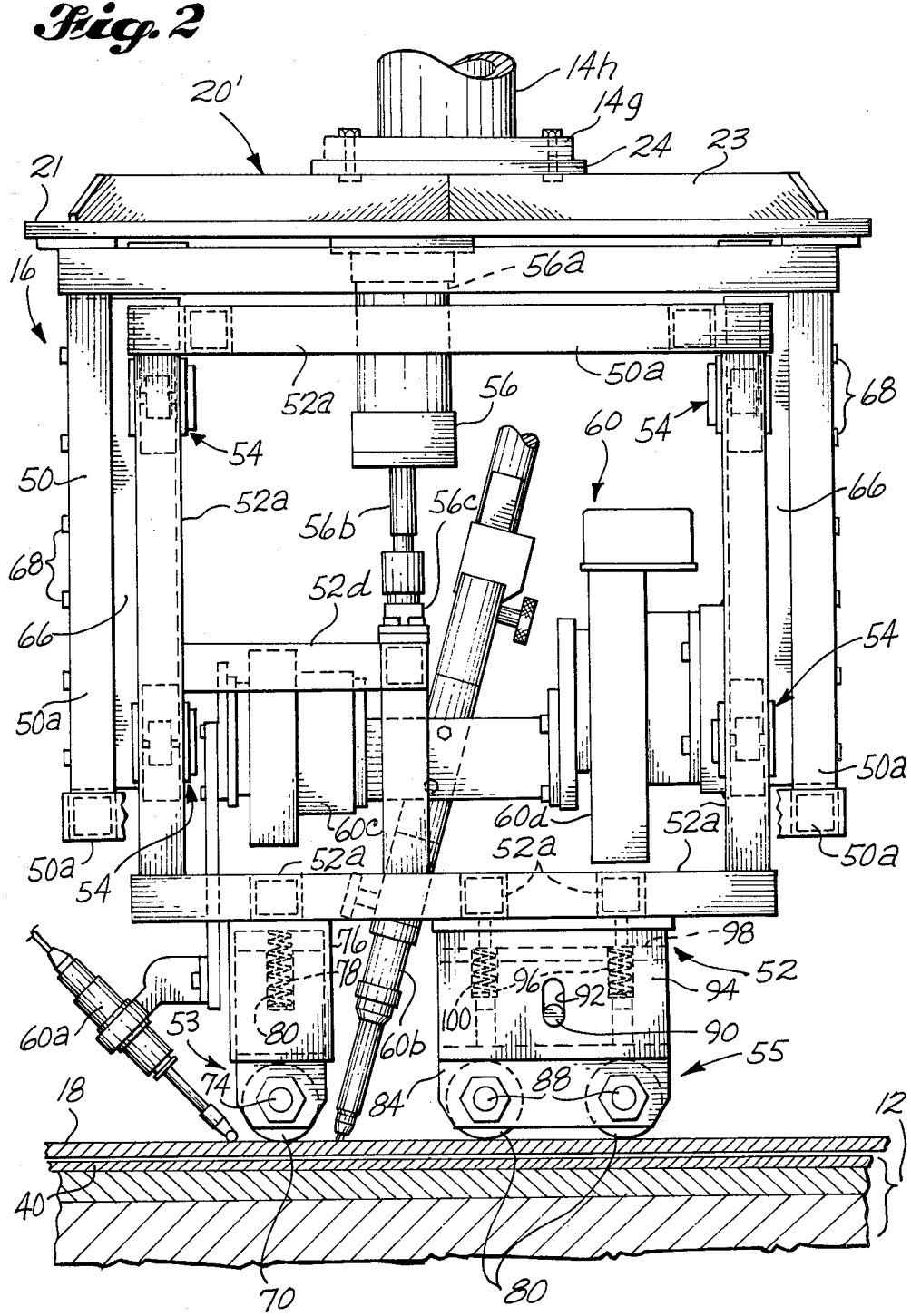
FIG. 2 is a side elevational view, partially cut away for clarity, of a torch and roller supporting head assembly that is mounted on a movable carriage of the gantry-type welding system of FIG. 1, for automatically forming continuous butt welds along seams joining flat metal workpieces.

Additionally, bed 12 is provided with a lengthwise extending, channel-shaped, butt weld backing strip 40 and a series of like, but crosswise oriented backing strips 42. As best shown in FIGS. 2 and 3, backing strip 40, has a channel-shaped cross section with the channel 42 facing upwardly and the upper extent of strip 40 being flush with the surface of bed 12. During the formation of a butt weld seam, the edges of the workpiece 18 to be joined are abutted along a line 44 (see FIG. 1) that is centered above channel 42. Each strip 40 is made from stainless steel so that the molten aluminum puddle that is formed along the seam opposite the welding torch is shaped by channel 42, without sticking thereto, thereby resulting in a weld of uniform thickness and strength along the seam.

With reference to FIG. 2, a configuration of the torch and roller support head assembly is shown in the form of head assembly 16' for forming butt weld seams joining relatively large panels or sheets of flat stock for the purpose of fabricating even larger panels, such as suitable for forming the hull and decking of ships. To demountably attach head assembly 16' to the gantry carriage 14f, the top of the head assembly includes a bracket 20 formed by a rectangular plate 21 reinforced on the upper surface thereof by crisscrossed stiffeners 23, to the center of which a circular attachment plate 24 is permanently affixed, such as by welding. Plate 24 is in turn bolted to a circular mounting plate 14g permanently secured to the lower end of a downwardly depending shaft 14h that is journaled for rotation, and controllably so, about a vertical axis, in gantry carriage 14f (see FIG. 1).

Supportively connected to the underside of bracket plate 21 are the following principal elements of head assembly 16a: a fixed, truck supporting frame 50 formed by a plurality of square cross section tubular members in the configuration of an open box-shaped structure; a truck subassembly 52 which includes another, but smaller box-shaped frame 52a of a shape similar to frame 50 but of a relatively smaller size so as to be nested within frame 50 and movable up and down through an open bottom of frame 50; truck guiding roller assemblies 54 for guiding truck 52, and in particular frame 52a, in a vertically reciprocating guide path relative to frame 50; a vertically acting pneumatic cylinder assembly 56 for controlling the vertical position of truck 50 with respect to frame 50; leading and trailing sets of down pressure roller assemblies 53 and 55, respectively; and, a centrally disposed, self-contained seam tracking, torch unit and welding torch assembly 60 which is mounted to truck frame 52a.

Truck guiding roller assemblies 54 are fixedly attached to the tubular members 52a of frame 52 adjacent the top and bottom thereof and ride on outwardly opposing guide surfaces 62 of guide blocks 64 fastened to opposing surfaces of vertically oriented guide members 66 that in turn are fixedly mounted to the stationary support frame 50 as best shown in FIG. 3. Guide members 66 are offset inwardly of frame members 50a and are attached to vertically and centrally oriented frame members 50b, one of which is visible in FIG. 3, by a series of bolt fasteners 68. The vertical travel of truck 52, accommodated by roller assemblies 54 and the guide surfaces 62 on blocks 64 is sufficient to retract the down pressure roller assemblies 53 and 55 up off of bed 12 and workpiece 18 for insertion, removal or repositioning of workpiece 18 relative to the vacuum hold-down bed 12.

Pneumatic cylinder assembly 56 is disposed substantially centrally of the head assembly 16' with an upper end 56a of the assembly secured to frame 50 and bracket plate 21 and with a lower end of a piston rod 56b coupled to a structurally reinforced load point 56c formed near the center of truck frame 52a by a plurality of crosswise mounted interior framing members 52d as best shown in FIG. 2. In this manner cylinder assembly 56 can be selectively operated to either lift truck frame 52a and hence truck 52 to retract it from workpiece 18, or it can be operated to compressively force frame 52a and hence truck 52 downwardly to react the down pressure roller assemblies 53 and 55 against the workpieces 18, as explained in greater detail hereinafter.

Unit 60 includes a seam tracking probe 60a located at the front of head assembly 16' to track the seam between the edges of workpiece 18 that are to be welded together, and a welding torch 60b for forming the butt weld. More specifically, the tip of torch 60b is disposed so as to form the weld at a location intermediate the down pressure roller assembly 53 and the trailing roller assembly 55 as shown in FIG. 2. A signal processing control 60c of unit 60 interprets signal information from probe 60a and causes the torch 60b to be moved crosswise of the workpiece seam as needed by means of an electromechanical positioning control 60d. Unit 60 is per se conventional, and a suitable unit may be obtained from Cyclomatic Industries, Inc. of San Diego, Calif.

With reference to FIGS. 2 and 3, the leading and trailing down pressure roller assemblies 53 and 55 are constructed so that the rollers have freedom of movement in the vertical direction (normal to workpieces 18), relative to frame 52a of truck 52, and include biasing springs 78 for providing a uniform down pressure on the rollers and hence on the workpieces when air cylinder 56 has been pressurized to displace truck 52 from a retracted position downwardly into an operative position. Moreover, the assemblies 53 and 55 are constructed so that each assembly includes at least one set of juxtaposed rollers, arranged on opposite sides of seam line 44 (see FIG. 4) and so that the rollers on one side of weld line 44 are independently movable in a vertical direction relative to the rollers on the opposite side of line 44. Such an arrangement enables truck 52 to exert equal down pressure adjacent the edges of workpieces of different thickness, and to accommodate waviness along the edges of relatively thin sheet aluminum or other sheet metal.

Thus, with reference to FIGS. 2 and 3, leading down pressure roller assembly 53 incorporates a set of juxtaposed rollers 70 which are individually mounted on separate sliders 72 by a bearing arrangement here provided by horizontally and inwardly projecting studs 74 fastened to downwardly projecting lugs 72a on sliders 72. The upper body portions of sliders 72 are slidably inserted into hollow, box-shaped, gusset reinforced receivers 76 which are open at the bottom and closed at the top. Compression springs 78 are disposed to act between each of the individually movable sliders 72 and cooperating receivers 76. Although not visible in the drawings, stops are provided for limiting the downward travel of sliders 72 with respect to receivers 76 so that the wheel assemblies remain in tact when the truck 52 is retracted upwardly from bed 12 and workpiece 18 by pneumatic cylinder assembly 56.

The trailing down pressure roller assembly 55 is similar to assembly 53 in that the former assemblies are constructed so as to have a freedom of movement in the vertical direction and are spring biased so as to apply a uniform down pressure against the edges of the workpieces adjacent the weld seam. Moreover, the trailing down pressure rollers on opposite sides of the weld line 44 (see FIG. 4) are independently movable relative to truck frame 52a as in the case of the leading down pressure rollers.

Assembly 55 is however different from assembly 53 in that the trailing assembly is constructed to apply a distributed down pressure over an extended lengthwise region proximate the weld seam for reasons explained more fully hereinafter. For this purpose, assembly 55 includes a first pair of rollers 80 spaced apart along the length of weld line 44 and adjacent to one side thereof (see FIG. 4) and a second pair of rollers 82 also spaced lengthwise along weld line 44 but on the opposite side thereof and in roller-to-roller registration with the pair of rollers 80. Each such pair of rollers 80 and 82 are mounted to separate bogie members 84 and 86, respectively, by a plurality of inwardly projecting studs 88 threaded and locked to the respective bogie members 84 and 86 by suitable nut fasteners. Studs 88 serve as the bearings of rollers 80 and 82 and as in the case of studs 74 for the leading roller assembly 53, studs 88 do not extend across the weld line 44, so that rollers 80 and bogie member 84 are independently movable in the vertical plane, relative to vertical movement of wheels 82 and their associated bogie member 86.

Bogie member 84 in FIG. 2, is connected to truck frame 52a by means of a bogie pivot pin 90 secured to an upper and central portion of member 84 and pivotally received within a vertically elongated slot 92 forward in a downwardly projecting bogie guiding and supporting plate 94 that is fixedly attached to the bottom of truck frame 52a. Bogie member 84 together with trailing down pressure rollers 80 is thus mounted for limited pivotal and translational movement with respect to support plate 94 in a vertical plane oriented lengthwise of the direction of travel of truck 52. To force bogie member 84 and hence rollers 80 downwardly against the workpiece, a pair of biasing springs 96 are mounted in compression adjacent opposed ends of bogie member 84 and a downwardly facing surface of a horizontally oriented plate 98 located adjacent the upper extent of support plate 94. Springs 96 are retained within vertically oriented bores 100 provided in bogie member 84 at locations generally overlying the bearing studs 88 of rollers 80. This arrangement of biasing springs 96 and the centrally pivoted bogie member 84 cause the down pressure force exerted by rollers 80 to be somewhat independent which in turn yields a more uniform distribution of down pressure over a lengthwise extended region trailing the tip of welding torch 60b.

Figure 4:
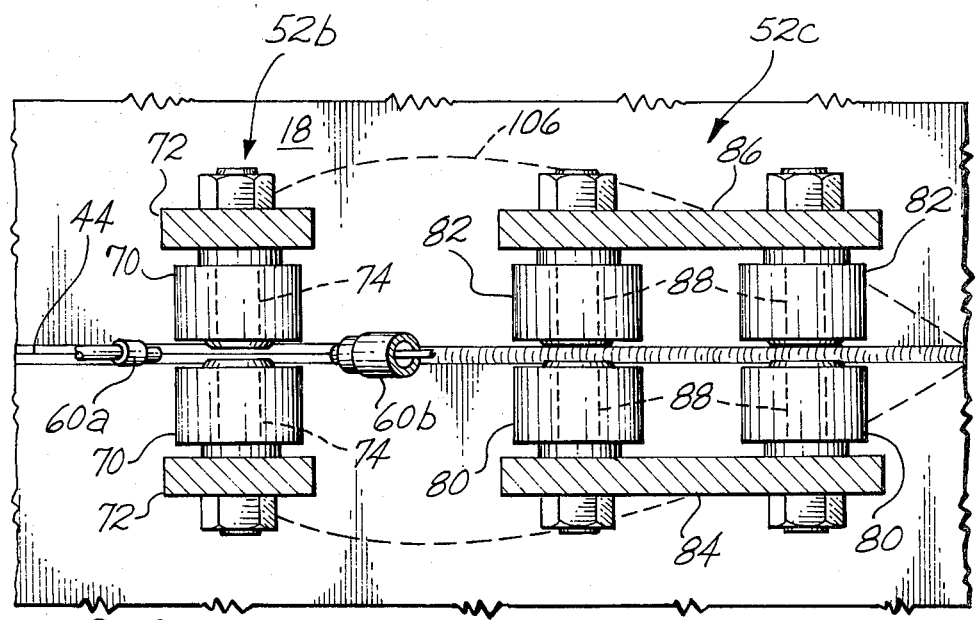
FIG. 4 is a top plan view of the plurality of down pressure rollers, a seam tracking probe and the tip of the welding torch all supported by the head assembly of FIGS. 2 and 3, as viewed from a horizontal cutting plane passing through the head assembly just above the rollers.

A like arrangement of components is provided on the opposite side of the head assembly for enabling independent down pressure exertion by trailing rollers 82 in conjunction with bogie member 86 (see FIG. 4). As in the case of the leading roller assembly 53, the independent vertical movement of the pairs of trailing rollers 80 and 82 enable the apparatus to accommodate different thicknesses of workpieces that are to be joined at the weld line 44, and to maintain a uniform down pressure force along each edge of each workpiece independently of relatively high or low points on the opposite sides of the seam due to such irregularities as waviness along the edges of thin workpiece sheets, even when the thickness of the workpieces to be joined are nominally the same.

The material used for the workpiece contacting surfaces of rollers 70, 80, and 82 is not critical and may, for example, include such metals as steel or aluminum, or may be one of a number of various known plastic synthetics that are relatively hard and heat resistant.

By employing the disclosed array of leading and trailing down pressure rollers as depicted in the top plan view of FIG. 4, a distributed down pressure force is exerted on the workpieces which is substantially coextensive with a teardrop-shaped localized hot zone indicated by a dotted line 106 that results from the travelling welding torch. Zone 106 is longitudinally symmetrical about the lengthwise direction of weld line 44 and has a leading edge that lies forward of the advancing welding torch 60b and a tapered trailing edge that extends for a greater distance to the rear of the welding torch 60b, as illustrated. This hot zone 106 is a moving zone that travels with welding torch 60b and is characterized by rapid expansion of the metal in the zone which tends to cause an upward buckling of the workpieces along weld line 44, followed by shrinkage of the same material that previously expanded, giving rise to distortion in the completed part unless the hot zone 106 is held flat during such successive expansion and shrinking. It is observed that the vacuum hold-down force applied to the underside of workpieces 18 has been found insufficient by itself to eliminate part distortion, especially with thinner sheet material such as one-eighth inch thick stock. However, the combination of the positive and area distributed down pressure provided by the array of roller assemblies 53 and 55 with the vacuum hold-down force which maintains the overall planarity of workpieces 18, has proved effective in producing distortion-free panels made up of smaller sections of flat stock.

After two or more sheets or sections of flat stock have been butt welded together, head assembly 16' (FIGS. 2-4) is replaced by another welding torch and roller supporting head assembly 16", (FIGS. 5-7), which serves to weld one or more elongate stiffeners 132 to the upwardly facing surface of the composite panel workpiece. For this purpose, head assembly 16" has a mounting bracket 20" (FIG. 5) of a construction similar to that described above for bracket 20' of head assembly 16', and thus includes a horizontally disposed, head support plate 120, a plurality of criss-crossed oriented plate stiffeners 122, and a circular mounting plate 124 that is removably bolted to the carriage mounting plate 14g as in the case of head assembly 16'.

Figure 6:
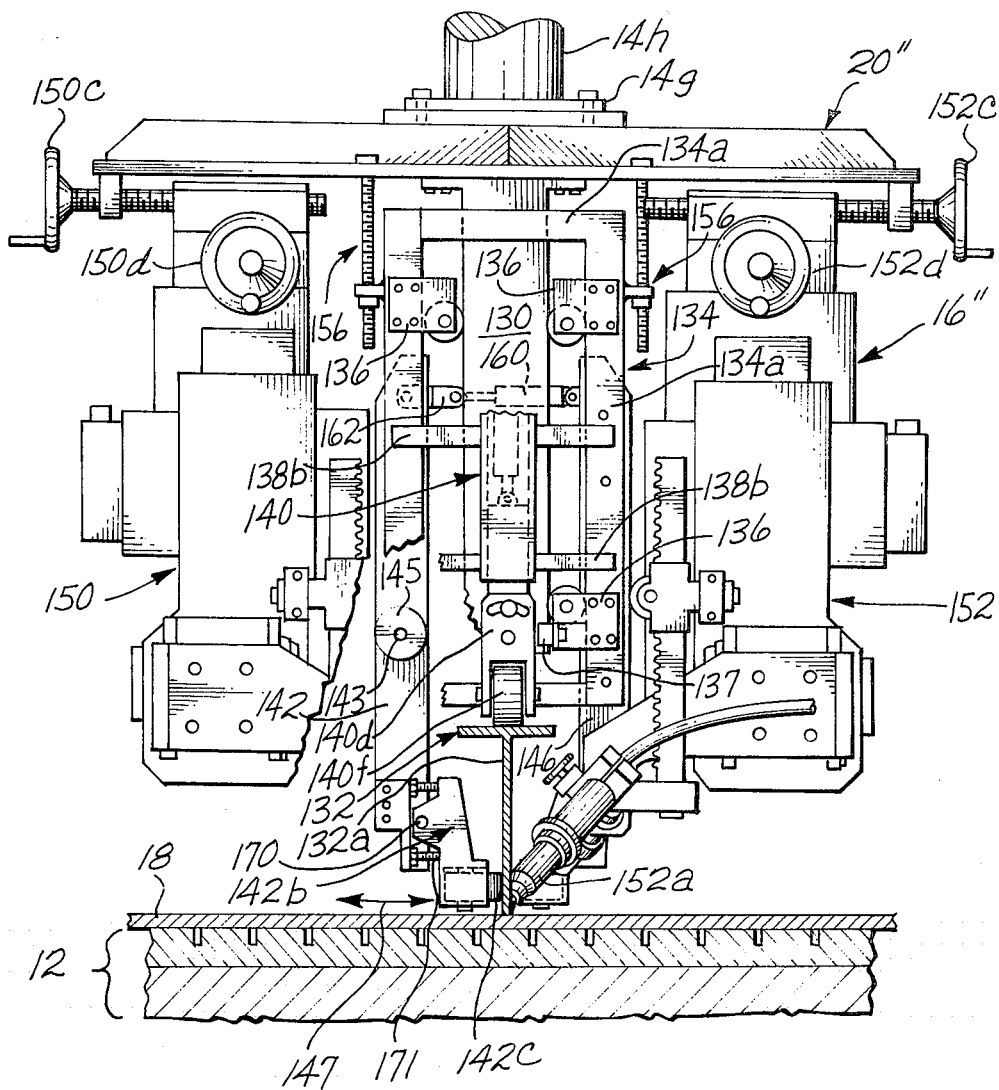
FIG. 6 is a rear elevational view, partly cut away and partly in vertical section for clarity, showing the stiffener position and welding head assembly of FIG. 5.

Supported by plate 120, so as to depend downwardly therefrom, head assembly 16" includes the principal components of: a pair of vertically oriented guide members 130, permanently fastened at their upper ends to plate 120 at locations spaced along the direction of travel of the head assembly and hence along the lengthwise dimension of the stiffener 132; a roller supporting truck assembly 134 including a box-shaped frame made of a plurality of square section tubular framing members 134a and a plurality of vertical guide roller assemblies 136 which engage and are guided by members 130; vertically oriented leading and trailing down pressure roller assemblies 138 and 140 mounted adjacent the front and rear of truck 134, respectively; a plurality of laterally opposed steering roller assemblies 142, 144, 146, and 148 (all of which are visible in FIG. 7); and a pair of laterally opposed seam tracking, torch positioning and welding torch units 150 and 152, one for each side of head assembly 16" as best shown in FIG. 6.

Truck frame 134 is mounted for vertical travel with respect to bracket 20" to provide a coarse height adjustment of the plurality of down pressure and lateral steering roller assemblies with respect to the panel workpiece 18 and stiffener 132. Vertical guide roller assemblies 136 are affixed to the vertical frame members 134a of truck frame 134 so as to be oriented inwardly, in opposed pairs for engaging opposed surfaces of the vertical guide members 130. Constraint in the direction perpendicular to the plane of FIG. 6 is provided by additional guides mounted on each of roller assemblies 136, as indicated by guide 137 in FIG. 6. The height position of truck frame 134 is adjusted and then set for each welding operation by such means as a plurality of vertically oriented height adjustment screws and associated locking nut assemblies 156.

Figure 5:
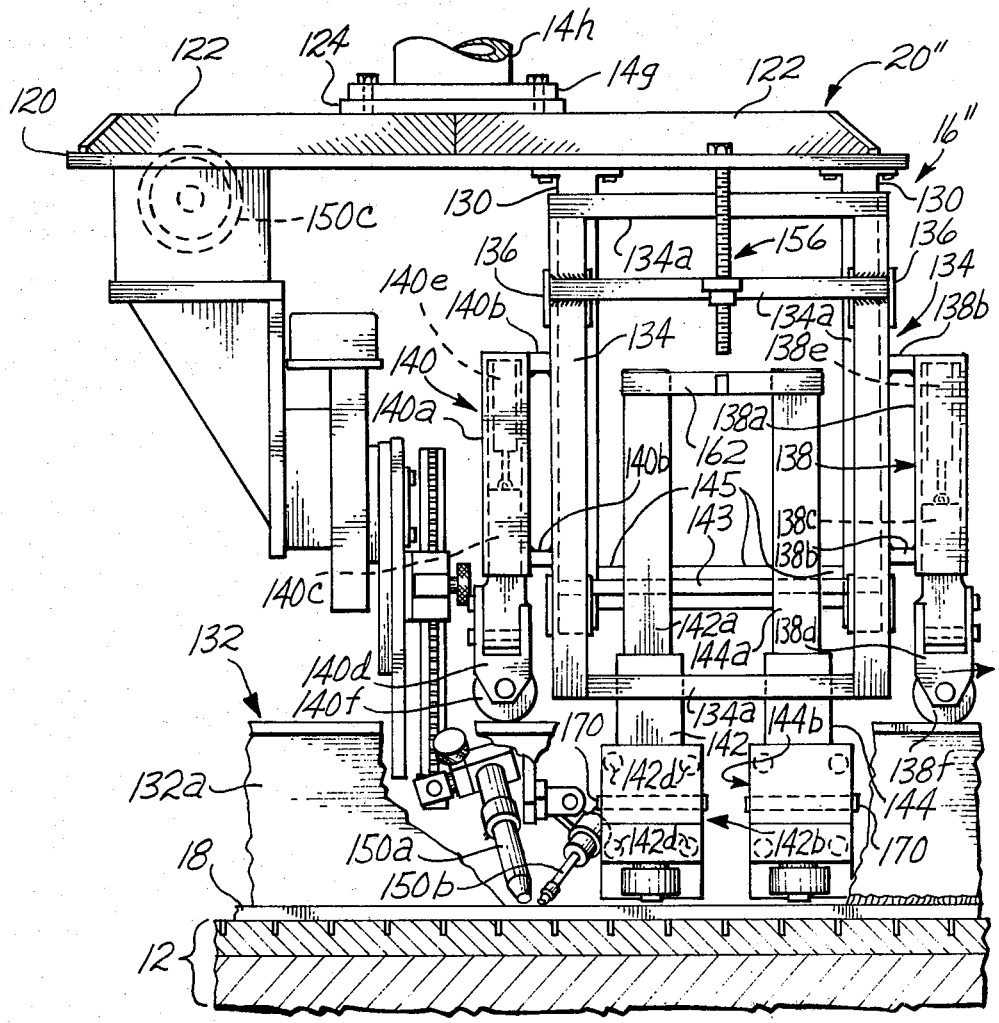
FIG. 5 is a side elevational view of a welding torch and roller support head assembly for welding stiffener webs to one face of a composite panel following the butt welding operations performed by the head assembly shown in FIGS. 2–4, in which the head assembly of FIG. 5 is interchangeable with the butt welding head assembly of FIGS. 2–4 in the welding system shown in FIG. 1.

Down pressure roller assemblies 138 and 140 are of substantially identical construction. Thus, as shown in FIG. 5, the leading down pressure roller assembly 138 includes a vertically oriented tubular guide member 138a, of square cross section, disposed substantially midway between the pair of vertical frame members 134a at the front of truck 134 and fixedly secured to such frame members by a pair of vertically spaced apart, cross bracket members 138b. The lower end of guide member 138 is open so as to telescopically receive an upper sliding portion 138c of a down pressure roller bearing support structure 138d. Disposed within a free space region existing between the upper extent of bearing support structure 138c and the top, closed end of guide member 138a, is a pneumatic cylinder assembly 138e, shown by hidden lines and having a vertical stroke for controllably displacing the telescoping portion 138c of structure 138d downwardly, with a predetermined amount of the down pressure. A down pressure roller 138f supported for rotation by structure 138d is thus urged downwardly against an upper flange or edge portion of stiffener 132 at the leading or front end of the assembly.

Similarly, the trailing down pressure roller assembly 140 includes a guide member 140a affixed to truck frame members 134a by cross brackets 140b, and a roller bearing support structure 140d has an upper, vertically elongated slider portion 140c that is telescopically received through the lower open end of guide member 140a. A pneumatic cylinder assembly 140e acts in a vertical direction to selectively displace structure 140d and a roller 140f carried thereby, downwardly against stiffener 132 at the rear or trailing end of truck frame 134.

As illustrated in FIG. 5, the trailing down pressure roller assembly 140 is located so as to substantially overlie the location of the welding torches, one of which is shown in FIG. 5 as torch 150a. Furthermore, the pneumatic cylinder assemblies 138e and 140e of assemblies 138 and 140, respectively, are differentially pressurized so as to provide a relatively lesser down pressure on the leading down pressure roller 138f compared to that on the trailing down pressure roller 140f. As explained more fully hereinafter, this differential down pressuring of the leading and trailing rollers provides sufficient constraint on the stiffener upstream of head assembly 16″ to prevent a tendency for the stiffener to be deflected upwardly by the welding operation, and at the same time, to permit sufficient lateral movement of the stiffener so that the steering roller assemblies 142, 144, 146, and 148 are effective to steer the unattached upstream portion of stiffener 132 laterally to the desired attachment line prior to the welding operation.

The relatively greater down force applied on trailing down pressure roller 140f, at a location generally overlying the welding torch tips, is sufficient to press the lower edge of the web portion 132a of stiffener 132 into positive contact with the upper surface of workpiece 18 to form an optimum weld with adequate penetration of the fillet welds from both sides of the web into the workpiece panel.

The lateral steering roller assemblies are constructed and mounted so as to be movable with respect to head assembly 16″ in a caliper-like fashion so as to maintain positive engagement with web 132a for proper stacking. More particularly, in the disclosed embodiment, one set of steering roller assemblies 146 and 148 is fixedly mounted to truck frame 134, and hence is stationary with respect to head bracket 20″ when the truck frame has been set to a desired elevation by screw adjustment assemblies 156. These fixed roller assemblies serve as a reference plane against which the web 132a is forced by the opposed and movable set of steering roller assemblies 142 and 144. Assemblies 142 and 144 include vertically elongated arms 142a and 144a which are articulated about a pivot shaft 143 supported at its opposite ends in the spaced-apart vertical truck frame members 134a that form one side of truck frame 134. Spacers 145 maintain a desired separation between steering roller assemblies 142 and 144, and between such assemblies and the adjacent frame members 134a, along the direction of travel of the head assembly. Shaft 143 is located approximately mid-height of assemblies 142 and 144 so that the lower ends thereof which mount the steering rollers are swingable transversely inwardly and outwardly with respect to web portion 132a of stiffener 132 as indicated by arrow 147 in FIG. 6. A lower, crosswise-oriented frame member 134a of frame 134 is disposed along a centerline of the head assembly 16″, in a position substantially overlying the stiffener 132, so as to be offset inwardly with respect to assemblies 142 and 144 so as to not interfere with the above-mentioned, transversely swingable movement relative to stiffener 132.

To actuate the articulated roller support assemblies 142 and 144 in a controlled fashion, the upper extents of arms 142a and 144a of such assemblies are jointly connected to a horizontally acting pneumatic cylinder assembly 160 (see FIG. 6) by a yoke structure 162. Cylinder assembly 160 is pressurized to extend lengthwise and act through yoke 162 to jointly force the upper ends of arms 142a and 144a outwardly, which thus respond as lever arms about the fulcrum of pivot shaft 143, forcing the lower, roller mounted ends of assemblies 142 and 144 inwardly against web 132a. As mentioned, the opposing set of steering roller assemblies 146 and 148 are nominally fixed with respect to head assembly 16″ and thus serve as a reference plane against which web 132a of stiffener 132 is forced by assemblies 142 and 144, from left to right as viewed in FIG. 6.

The individual rollers of assemblies 142, 144, 146, and 148 are rotatably mounted about nominally vertical axes in roller bearing support shoes, such as illustrated by roller 142c mounted in shoe 142b. As more fully described below in connection with FIG. 8, show 142b of assembly 142, and like roller bearing support shoes 144b, 146b, and 148b of assemblies 144, 146, and 148, respectively, (see FIG. 7) are each mounted for adjustable, limited, pivotal rotation so that the steering rollers can be tilted with respect to a vertical plane (normal to the face of workpiece 18) for providing a precamber to stiffener 132 to compensate for certain weld shrinkage distortion otherwise imparted to stiffener 132 during the welding operation.

Figure 7:
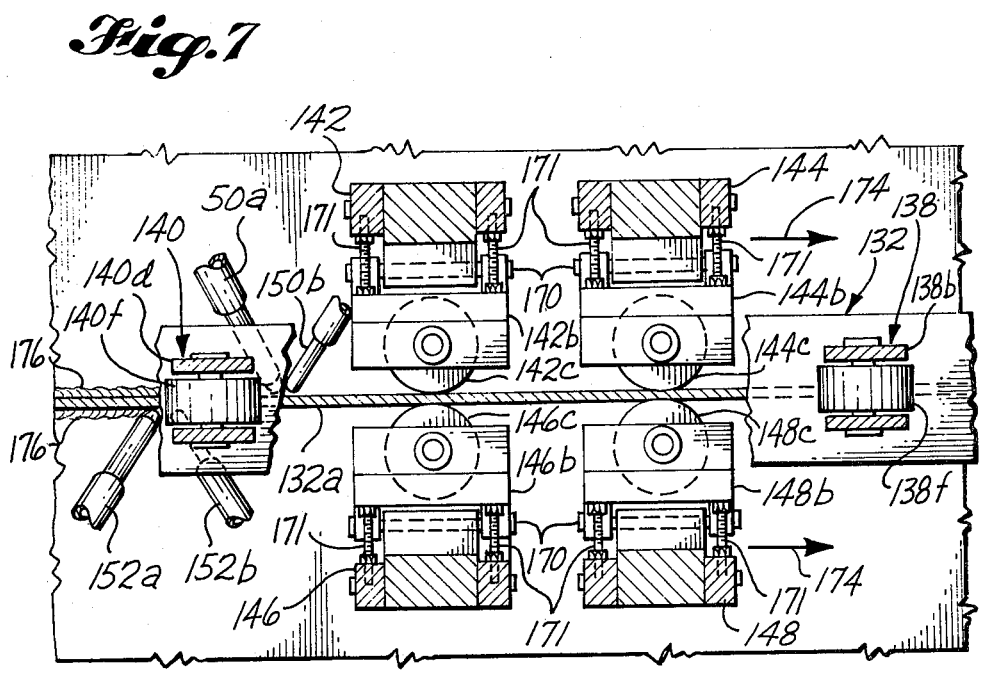
FIG. 7 is a top plan view of the plurality of seam tracking probes, welding torch tips, steering and down pressure rollers of the head assembly shown in FIGS. 5 and 6, as viewed from a horizontal cutting plane passing through the head assembly just above the rollers, and in which portions of the top flange of a T-section stiffener have been cut away for clarity.

Seam tracking, torch positioning, and welding torch units 150 and 152 are individually supported at their upper extents by support plate 120 of bracket 20″ and depend downwardly therefrom on laterally opposed sides of frame 134 as best shown in FIG. 6, so as to dispose the respective welding torches 150a and 152a, and the associated seam tracking probes 150b and 152b adjacent opposite sides of stiffener web 132a (see FIG. 7). Torches 150a and 152a are angled inwardly, downwardly, and forwardly with respect web 132a and probes 150b and 152b are angled inwardly, downwardly, and forwardly. Units 150 and 152 each include position controls that automatically move the tips of the respective torches 150a and 152a along horizontal and vertical axes transverse to the length of web 132 and hence transverse to the direction of head travel. Movement of the torch tips along these orthogonal axes is automatic in response to the sensing of the seams adjacent opposite lower edges of web 132a by probes 150b and 152b. The thusly controlled movements of torches 150a and 152a are independent. Units 150 and 152 are also provided with manual, crosswise and lengthwise positioning mechanisms indicated at 150c, 150d, and 152c, 152d (see FIG. 6) for setup positioning of the respective welding tips and seam tracking probes. Units 150 and 152 are available ascompleted subassemblies from various commercial sources, including the above-mentioned company, Cyclomatic Industries, Inc. of San Diego, California.

With reference to FIG. 7, the tips of torches 150a and 152a are shown to be offset or staggered along the direction of head travel, which is indicated by the direction arrows 174. The staggering of torches 150a and 152a has been found necessary to avoid excessive heat buildup (and faulty welds) where the fillet welds join the lower edges of web 132a to workpiece 18, which otherwise occurs if both torches are directly opposed to each other across the thickness of web 132a. Thus, as shown in FIG. 7, the tip of torch 150a is positioned upstream of the tip of torch 152a. Furthermore, it is desirable to dispose both torches 150a and 152a at positions generally underlying the trailing down pressure roller assembly 140, and hence as shown in FIG. 7, torch 150a is located generally below but slightly in advance of the point of contact of down pressure roller 140f with stiffener 132, and the tip of torch 152a is located generally below and slightly downstream of the point of contact of roller 140f.

As mentioned, the leading and trailing down pressure roller assemblies 138 and 140, respectively, are provided with separate, pneumatic down pressure controlling cylinder assemblies 138e and 140e, respectively, (FIG. 5) so as to provide a differential down pressure on these rollers for cooperating with the lateral steering function of the guidance roller assemblies 142, 144, 146, and 148. More particularly, the down pressure on leading roller assembly 138 is just sufficient to force the unattached, upstream portion of stiffener 132 downwardly so that the lower edge of web 132a is forced to a near-final position with respect to the surface of panel workpiece 18, however, without so much down pressure as to prevent the web 132a from being transversely or laterally deflected by the steering wheels 142c, 144c, 146c, and 148c. This amount of down pressure exerted on stiffener 132 upstream of the steering roller assemblies is needed to prevent an uptilting of the unattached stiffener, upstream of the advancing head assembly 16" due to the effects of weld shrinkage.

Following the leading down pressure roller assembly 138, the articulated steering roller assemblies 142 and 144 act transversely to the length of web 132a forcing it against the reference steering roller assemblies 146 and 148 to align the web with the desired and predetermined attachment line on workpiece 18. After this steering positioning of web 132a, the trailing down pressure roller assembly 140, operated at a substantially greater down pressure than assembly 138, presses the lower edge of web 130a down into forced, positive contact with the workpiece surface. Sufficient down pressure is exerted by trailing down pressure roller 140 to prevent any lateral slippage or deflection of web 132a after it has been steered to the proper line of attachment, and to ensure an optimum degree of penetration by fillet welds 176.

As mentioned above, the down pressure roller bearing support structures 138d and 140d, and the roller bearing support shoes 142b, 144b, 146, and 148b are mounted for limited, adjustable rotation about their respective supporting structures to apply a precamber or tilt to stiffener 132 upstream of welding torches 150a and 152a. Thus, with reference to FIG. 8, the leading down pressure roller assembly 138 has a structure 138d pivotally connected to the slider portion 138c by the shank of a bolt 180 oriented parallel to the direction of head travel and hence parallel to the length of web 132a. Above pivot bolt 180, is another, likewise-oriented bolt 182 that cooperates with an arcuate slot 184 in structure 138d so that bolts 180 and 182 may be loosened and structure 138 adjustably pivoted to tilt the face of down pressure roller 138f as shown. Additionally, bolt 180 cooperates with a horizontally elongated slot 186 in support structure 138d to enable structure 138d to be shifted right or left as viewed in FIG. 8 to position the roller over the stiffener web 132a so that the down pressure load is transmitted through web 132a.

Similarly, each of the steering roller shoes are mounted for limited adjustable rotation about pivot pins 170 which, as shown in FIG. 8, allow roller support shoes 144b and 148b to be tilted clockwise or counterclockwise with respect to a nominally vertical orientation, nominal the horizontal plane of workpiece 18. For cooperating with pivot pins 170, each steering roller shoe has a set of four, adjustable screw stops 171 so that after the shoes 142b, 144b, 146b, and 148b have been pivoted to present a desired cant or tilt, they can be set and then locked in place by tightening stops 171.

Because of the required, lengthwise staggering of welding torches 150a and 152a along the direction of travel of head 16", the leading torch 150a forms its fillet weld 176 (see FIG. 7) in advance of the fillet weld on the opposite side of web 132a. As a result, the initial expansion and succeeding shrinkage of the material in the vicinity of the fillet weld on the lead torch side of web 132a tends to pull the web over to one side of the structure, tilting it toward the side of the leading welding torch. To compensate for this weld shrinkage distortion, steering roller assemblies 142, 144, 146, and 148 are adjustably tilted from a nominally vertical orientation by using pivot pins 170 and adjustable screw stops 171 as described above to tilt web 132b relative to the nominally vertical plane in a direction away from the lead torch 150a. Similarly, down pressure roller support structures 138d and 140d may be cocked using bolts 180 and 182 and arcuate slot 184 as described above, to accommodate the transversely slanted surface of the T-flange of stiffener 132 as shown in FIG. 8.

The precamber applied to the web 132b in front of the advancing welding torches 150a and 152a has been found to cause stiffener 132b to assume a substantially vertical orientation after the fillet welds 176 have been completed by the passing of head assembly 16". While it might be thought that the heat shrinkage caused tilting of web 132b by the leading fillet weld (here performed by torch 150a) would be corrected by the succeeding formation of the fillet weld on the opposite side of the web (by torch 152a), however, it has been found that the initial cocking of the web by the first fillet weld is never totally counteracted by the later formed fillet weld on the opposite side of the web. Thus the adjustable pivoting of the various down pressure and steering roller assemblies has proved an effective solution to eliminate this type of distortion in the finished product.

While head assembly 16" has been shown and described in connection with the placement, positioning, holding and welding of a stiffener 132 of T-shaped cross section, it will be appreciated that the head assembly may be used in conjunction with stiffeners of various cross sections including a straight web, I-section, L-section, C-section (or channel shape), Z-section, etcetera.

With reference to FIGS. 9 and 10, each of the orthogonally intersecting slots 30 on the face of vacuum holddown bed 12 are adapted to receive the edgewise insertion of strips 188 of elastomeric material to form a seal between bed 12 and the lower surface of workpiece 18. The provision of slots 30 and elastomeric sealing strips 188 to form, in conjunction with vacuum ports 32, a vacuum hold-down or suction on a table or bed, is per se known.

However, in accordance with the present invention, the otherwise conventional use of strip-receiving slots 30 has been modified to provide chamfers 190 so that when the upper protruding edge of sealing strip 188 is compressed by workpiece 18, the mushroomed head of the material is accommodated by the chamfers 190 as shown by FIG. 10.

In connection with the gantry-mounted panel welding apparatus 11 as shown in FIG. 1, the large, relatively thin panels that are to be welded as workpiece 18, do not always exhibit a perfectly planar lower surface when laid on bed 12. For this purpose, it has been necessary to use a sealing strip 188 that, when inserted in slot 30, projects by an unusually large amount above the surrounding plane of bed 12. In the absence of chamfers 190, the projecting edge of strip 188 mushrooms out onto the flat surface of bed 12 not only damaging the strip 188, but also presenting an irregular supporting surface to the underside of workpiece 18. The provision of suitable chamfers 190 eliminates this problem by providing a sufficient receptacle for the flattened or mushroomed edge of strip 188, thereby ensuring a good seal together with a true, plane surface on bed 12 for supporting workpiece 18, and also eliminating cutting, galling, or other injury to strips 188.

While only particular embodiments have been disclosed herein, it will be readily apparent to persons skilled in the art that numerous changes and modifications can be made thereto, including the use of equivalent devices, means, and method steps, without departing from the spirit of the invention.

The embodiments of the invention in which an exclusive property or privilege is claimed are defined as follows:

1. A welding apparatus for automatically or semi-automatically welding butt seams to join abutting edges of flat workpieces, comprising in combination:
   a workpiece supporting bed including vacuum means for releasably holding down the workpieces flat against the bed;
   carriage supporting means overlying said bed;
   traveling carriage means cooperating with said carriage support means for controlled travel in a plane overlying said bed;
   a welding torch and workpiece positioning roller head assembly mounted on said carriage means for traveling therewith relative to said bed, said head assembly comprising:
   truck support means fixedly mounted on said carriage means;
   truck means coupled to and cooperating with said truck support means for movement of said truck means toward and away from said workpiece supporting bed;
   means for controllably moving said truck means relative to said truck support means between a retracted position spaced from said bed and an operative position proximate said bed;
   welding torch means mounted on said truck means so as to be disposed for traveling therewith relative to said bed and so that said torch means can be guided along a seam between abutting edges of workpieces held by said bed to form a butt weld therealong;
   and a plurality of down pressure roller means mounted on said truck means for rolling contact with workpieces supported on said bed when said torch means is guided along a seam, said down pressure roller means including a leading set of down pressure rollers disposed at a predetermined distance in advance of said torch means, and further including a trailing set of down pressure rollers disposed at a predetermined distance behind said torch means with respect to the direction of travel, said leading and trailing sets of down pressure rollers being sized and said predetermined distances selected so as to contact and apply down pressure to the workpieces at locations distributed over a predetermined, localized traveling zone of welding heat induced distortion on the workpieces, said traveling zone extending ahead and behind and laterally of said welding torch means; and
   wherein said plurality of down pressure roller means comprise a plurality of roller support means for mounting said leading and trailing sets of rollers so as to be independently movable toward and away from said truck means, and a plurality of biasing means for reacting against said truck means so as to independently urge said leading set and trailing set of rollers downwardly toward said bed and workpieces thereon when said truck means is moved from said retracted position to said operative position.

2. The welding apparatus of claim 1 wherein said leading set of down pressure rollers comprise first and second juxtaposed rollers disposed on opposite sides of a vertical plane defined by the path of travel of said torch means, so that said first and second rollers contact opposite workpiece edges adjacent a seam.

3. The welding apparatus of claim 2 wherein said leading set of down pressure rollers comprise first and second roller support means for said first and second rollers, respectively, said first and second roller support means being mounted to said truck means for independent vertical reciprocation relative to said truck means, and said biasing means comprising first and second biasing means for respectively urging said first and second roller support means downwardly with respect to said truck means.

4. The welding apparatus of claim 1 wherein said trailing set of rollers comprises third, fourth, fifth and sixth rollers, a first boggie means mounting said third and fourth rollers to said truck means on one side of vertical plane defined by the path of torch travel, and a second boggie means mounting said fifth and sixth rollers to said truck means on the opposite side of said vertical plane, so that said third and fourth trailing down pressure rollers hold down one workpiece edge and said fifth and sixth trailing down pressure rollers hold down the opposite workpiece edge.

5. The welding apparatus of claim 4 wherein said first and second boggie means comprise separate means for independent vertical movement of said third and fourth rollers with respect to said fifth and sixth rollers, and separate biasing means reacting against said truck means for urging said first boggie means including said third and fourth rollers downwardly toward said bed and further separate biasing means reacting against said truck means for urging said second boggie means including said fifth and sixth rollers downwardly toward said bed.

6. A welding apparatus for automatically or semi-automatically fillet welding an elongate stiffener to a flat workpiece, comprising in combination:
   a workpiece supporting bed including vacuum means for releasably holding down a workpiece flat against the bed;
   carriage supporting means overlying said bed;
   traveling carriage means cooperating with said carriage support means for controlled travel in a plane overlying said bed;
   a welding torch and stiffener positioning head assembly mounted on said carriage means for traveling therewith relative to said bed and a workpiece held down thereon, said head assembly comprising:

a first welding torch means mounted on said head support structure and disposed for forming a fillet weld along a seam at which one lengthwise edge of a stiffener contacts an upper surface of a flat workpiece:

a plurality of coacting down pressure and lateral steering roller assemblies supported by said head support structure;

said down pressure roller assemblies comprising a leading down pressure roller assembly and a trailing down pressure roller assembly, truck means for mounting said leading and trailing down pressure roller assemblies with respect to said head support structure for rolling contact with an upper lengthwise surface portion of a stiffener at locations spaced apart along a direction of head travel and so that said leading down pressure roller assembly contacts a stiffener at a predetermined distance in advance of said first welding torch means and so that said trailing down pressure roller assembly contacts such stiffener at a location adjacent said first welding torch means;

said lateral steering roller assemblies comprising at least first and second steering roller assemblies mounted on said head support structure so as to act inwardly against opposite sides of a stiffener for rolling contact with side portions thereof at a location along the direction of head travel that is intermediate said leading and trailing down pressure roller assemblies so as to laterally steer a stiffener to a predetermined line of attachment prior to formation of a fillet weld by said first welding torch means.

7. The welding apparatus of claim 6 wherein said leading and trailing down pressure roller assemblies comprise separate, independently controllable pressure exerting means for applying a different down pressure on said leading down pressure roller assembly relative to said trailing down pressure roller assembly.

8. The welding apparatus of claim 7 wherein said separate, independently controllable pressure exerting means comprise a leading fluid pressure actuated cylinder means, and a trailing fluid pressure actuated cylinder means.

9. The welding apparatus of claim 6 further comprising a second welding torch means mounted on said head support structure in generally opposed relation to said first torch means for forming another fillet weld along a seam at which a laterally opposed lengthwise edge of a stiffener contacts the workpiece, said first and second welding torch means being staggered along the direction of head travel so that said first torch means forms its fillet weld in advance of the fillet weld formed by the second torch means.

10. The welding apparatus of claim 9 for attaching a stiffener having a web portion, the lower lengthwise edge of which is to be fillet welded to the workpiece, and wherein said lateral steering roller assemblies comprise roller bearing support structures and associated roller tilting adjustment means for applying a precamber tilt to a stiffener web upstream of said first welding torch means.

11. The welding apparatus of claim 10 wherein said leading down pressure roller assembly comprises a roller bearing support structure and associated roller tilting adjustment means for coacting with said tilting adjustment means of said steering roller assemblies.

12. The welding apparatus of claim 6, wherein said first steering roller assembly comprises a vertically oriented arm pivotally mounted relative to said head support structure so that a lower end thereof is swingable transversely inwardly and outwardly relative to a side of a stiffener and in laterally opposed relation to said second steering roller assembly, and roller bearing means and an associated steering roller being mounted at said lower end of said arm.

13. The welding apparatus of claim 12 further comprising actuator means for biasing said arm so as to force the lower end thereof inwardly to cause a said steering roller to contact a stiffener and laterally force it against the opposing second steering roller assembly.

14. The welding apparatus of claim 6 further comprising third and forth steering roller assemblies mounted in said head support structure adjacent said first and second steering roller assemblies and intermediate said leading and trailing down pressure roller assemblies, said third and forth steering roller assemblies acting inwardly against opposite sides of a stiffener for rolling, lateral steering contact therewith, said first and third steering roller assemblies being disposed on the same side of a stiffener and each comprising vertically oriented arms which are pivotally mounted relative to said head support structure about a pivot axis paralleling the direction of head travel so that the lower ends of said arms are swingable laterally inwardly and outwardly with respect to a stiffener side, and roller bearing means and associated steering rollers being affixed to said lower ends of said arms, and fluid pressured operated means for biasing said arms to cause the lower ends thereof to be forced inwardly toward a side of a stiffener.

15. A method of automatically or semi-automatically welding an elongate stiffener to a substantially flat workpiece, comprising the steps of:

holding such workpiece down against a supporting bed by developing a suction force on the underside of the workpiece;

controllably guiding a welding torch, down pressure and steering roller supporting head assembly along a predetermined stiffener attachment line on an upwardly facing surface of the workpiece so as to form a fillet weld along a lengthwise edge portion of a stiffener that is in contact with said workpiece surface;

exerting an initial down pressure on the stiffener in advance of the forming of said fillet weld by a leading down pressure roller mounted on said head assembly;

laterally steering the stiffener, also in advance of the forming of said fillet weld by exerting inwardly opposing side pressure on the stiffener with laterally movable steering rollers disposed downstream of the leading down pressure roller; and, exerting a final down pressure on the stiffener at a location adjacent to the point of formation of the fillet weld by a trailing down pressure roller mounted on said head assembly.

16. The method of claim 15 wherein said initial down pressure on the stiffener is selected to be less than the final down pressure so as to permit effective lateral steering of the stiffener by the intervening steering rollers.

17. The method of claim 15 wherein said step of controllably guiding said head assembly comprises concurrently guiding an additional welding torch also mounted on the head assembly and disposed to form a second fillet weld on an opposite side of the stiffener from the first mentioned fillet weld, and wherein said torches are staggered along the direction of travel of the head assembly so as to apply said first mentioned fillet weld in advance of said second fillet weld.

18. The method of claim 17 wherein said step of controllably guiding said head assembly further comprises applying a precamber to the stiffener in advance of the formation of the first mentioned fillet weld so as to compensate for weld shrinkage distortion in the stiffener orientation due to the staggering of the welding torches.

19. The method of claim 18, wherein said step of applying the precamber comprises transversely tilting the axes of the steering rollers.

20. The method of claim 19, wherein said step of applying the precamber further comprises transversely tilting the axis of the leading down pressure roller.

* * * * *